May 7, 1968     H. N. LUIJT     3,381,318
PLUMBING FITTING

Filed Oct. 22, 1965     2 Sheets-Sheet 1

INVENTOR.
HERMANUS N. LUIJT
BY
ATTORNEYS

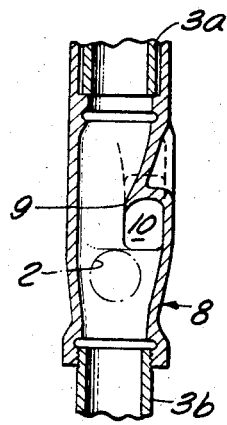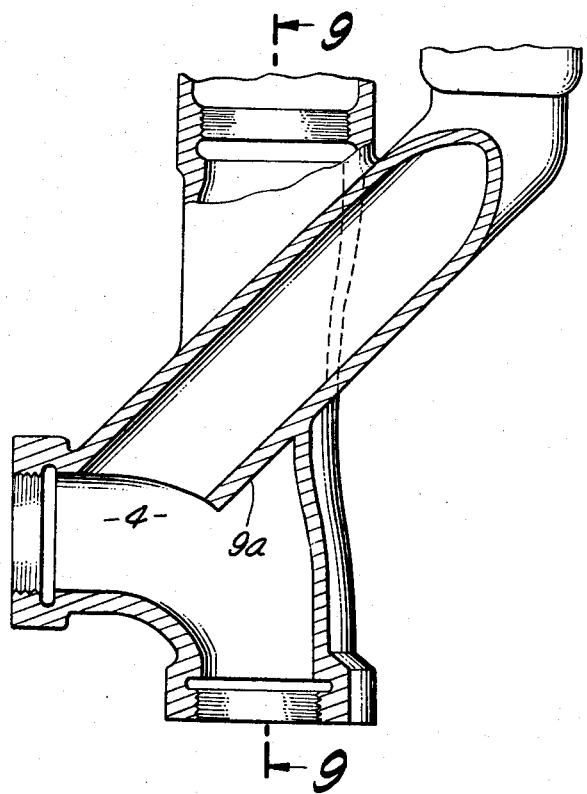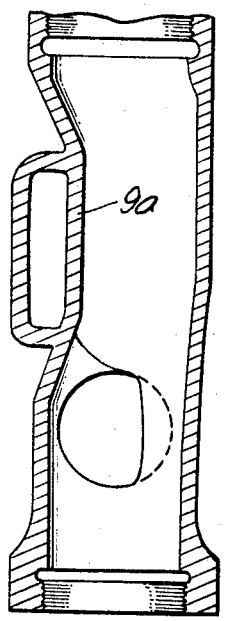

United States Patent Office 3,381,318
Patented May 7, 1968

3,381,318
PLUMBING FITTING
Hermanus N. Luijt, 4105 Glencoe Ave.,
Venice, Calif. 90291
Filed Oct. 22, 1965, Ser. No. 501,421
13 Claims. (Cl. 4—211)

ABSTRACT OF THE DISCLOSURE

A plumbing fitting with a chamber for connecting two sections of a waste pipe which are essentially in alignment with each other, a waste inlet into the chamber and positioned between the two ends of the waste pipe and a vent pipe, one end for connecting with a vent stack and the other end entering the chamber and an air passage from that point to the waste inlet within the chamber so that there is an air passage from the vent stack to the waste inlet even when waste fluid is passing through the chamber.

This invention relates to a novel plumbing fitting. More specifically, the invention is a plumbing fitting providing for a connection from a waste trap to both a waste stack and a vent stack.

In a conventional plumbing system for waste disposal, waste water from a sink or other source first passes through a trap before entering a waste stack leading to a sewage line. The trap, usually U-shaped, prevents gases from the sewer from entering the house or building through the waste line. Thus, at all times there should be liquid contained in the trap. In order to prevent emptying of the trap due to siphoning, a vent is provided so that at all times both the inlet and outlet side of the trap are maintained at atmospheric pressure. The conventional method of providing for connection of a trap to vent stack and waste stack requires many fittings and consumes a great deal of space.

It is an object of the present invention to provide for a more convenient economical system of connecting a drain trap to waste stack and vent stack.

It is a further object of this invention to provide a fitting making it possible to reduce the number of components necessary to connect a drain trap to a waste stack and vent stack.

It is further an object of this invention to provide for a more reliable waste system wherein there are fewer fittings which may fail.

A better understanding of the invention can be had by reference to the accompanying drawings wherein:

FIGURE 7 is a sectional view similar to FIGURE 2 indicating an alternative lip structure.

FIGURE 8 is a sectional view of an alternative form of vent for the plumbing fitting of this invention.

FIGURE 9 is a sectional view taken as indicated by line 9—9 on FIGURE 8.

Figure 1:
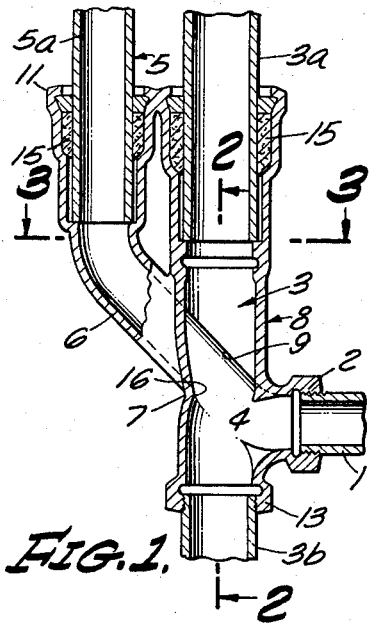
FIGURE 1 is a sectional view of the plumbing fitting and portions of the vent stack, waste stack and waste trap to which it is connected.

A portion of the line 1 from a waste trap is shown in FIGURE 1. The waste trap is connected to the plumbing fitting of this invention at the waste inlet 2 Basically, the invention comprises a single plumbing fitting which will connect a drain trap to both a waste stack and a vent stack. Waste material may flow through waste inlet 2 into waste stack 3, the upper portion of which is designated 3a and the lower portion, 3b. As shown, the fitting connects two sections of a waste stack. Thus, waste will enter the lower portion of the waste stack 3b both through waste inlet 2 and from the upper portion of the waste stack 3a coming from a floor above. In order to prevent a siphoning action which would draw waste material from the waste trap, it is necessary to maintain atmospheric pressure in the area generally indicated by 4. Atmospheric pressure at 4 is maintained by means of an air passage leading from 4 to the vent stack 5 which communicates with the atmosphere. The initial portion of the air passage from its communication with the vent stack is a conventional conduit or pipe 6. However, at 7 where the air passage enters the portion of the fitting connecting the waste stack, generally indicated by 8, in order to prevent the flow of sewage from blocking the air passage, a sewage diversion means indicated by lip 9 is provided.

Figure 2:
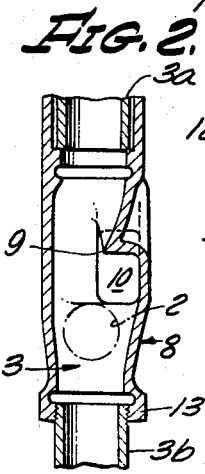
FIGURE 2 is a sectional view taken as indicated by line 2—2 on FIGURE 1.

The manner of maintaining an air passage by means lip 9 can more easily be seen by reference to FIGURE 2. Sewage flowing downwardly from waste stack 3a through the fitting is diverted by lip 9 so that an air passage is maintained at 10. The air passage 10 extends across the fitting from waste inlet 2 to vent pipe portion 6.

Figure 3:
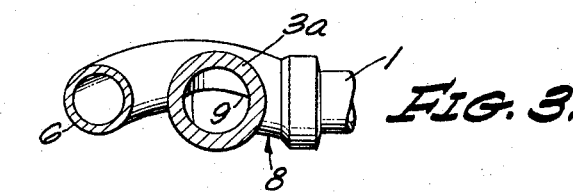
FIGURE 3 is a sectional view taken as indicated by line 3—3 on FIGURE 1.

FIGURE 3, a sectional view from above, indicates the position of lip 9 with respect to a downward flowing stream of waste. Any type of lip design which will divert the waste flow and provide for an air passage from the waste inlet at 4 to the air vent may be used.

FIGURE 7, a sectional view, illustrates a preferred way of forming the lip. It can be seen that by extending the lip downward to some extent, the maintenance of an air passage is more certain.

In FIGURES 8 and 9, still another embodiment of the invention is illustrated. The air passage is completely enclosed across the major portion of the sewage passage by means of the wall indicated at 9a. Venting connection with the waste inlet is provided by the opening of the vent line at 4. This structure has the advantage that an air passage is insured because downward flowing sewage cannot contact the air passage.

The connection to the vent stack from a particular waste drain system, such as a sink, must be above the level of the sink to prevent waste from flowing into the vent stack if the waste stack becomes clogged without such waste first backing up into the sink where it would be observed. The fitting of FIGURE 1 could easily be used on the bottom floor of a building since there is no lower section of the vent stack. Either the embodiment shown in FIGURE 1 or that shown in FIGURE 4 could be used upon floors above the first. The embodiment of FIGURE 4 has an elongated upwardly extending section 6a with means for connecting the fitting directly to both the upper and lower sections of a vent stack. The structure of FIGURE 1 may be connected into the two sections of a vent stack indirectly by means of an upwardly extending section of pipe connected at a right angle to a T in the vent stack.

Figure 4:
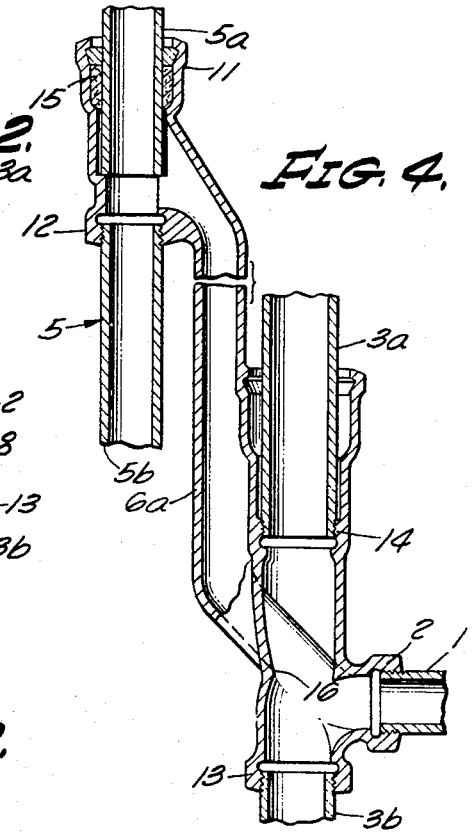
FIGURE 4 is a sectional view indicating an alternative method of attachment of the plumbing fitting to the waste stack and vent stack.

Another novel feature of my fitting is the deflecting means indicated as 16 in FIGURES 1 and 4. This deflector is a projection from the inside wall of the waste stack connection portion of the fitting at a point opposite the waste inlet. The deflector is at an angle with the wall so that cleaning tools will be deflected downward.

Normally, the fitting is made from cast iron, copper, etc. However, any other means of fabrication may be employed and other materials of construction such as various metals, alloys and plastics may be employed. The vent stack, waste stack, and waste trap line may be secured to the fitting by a threaded fitting as shown at 2, 13 and 14. However, the fitting may be joined to the other pipes by means of a sealing compound such as solder or caulking compound 15. A combination of screw threads and sealing compound or any other suitable means of connection may be used if desired.

An important feature of this invention is the direct communication of the air passage with the waste passage at the waste trap entry. Because of this communication, it is necessary to employ diverting means such as a lip or wall to keep the flow of waste materials out of the air passage. However, this construction greatly facilitates the fabrication of the fitting. Thus, in making the fitting, only one core is necessary. If the air passage and waste conduit did not communicate, it would be necessary to use two cores thus, introducing problems in spacing the cores and increasing fabrication costs.

It is usually desired to place a fitting of this type in the wall of a normal stud wall structure, and therefore, it is necessary to construct the fitting so that its thickness is slightly less than that of a stud. Because of the novel structure provided by this invention, it is possible to limit the width of this fitting to somewhat less than that of a conventional 2 x 4 stud and yet provide for a flow cross section of conventional size.

Figure 5:
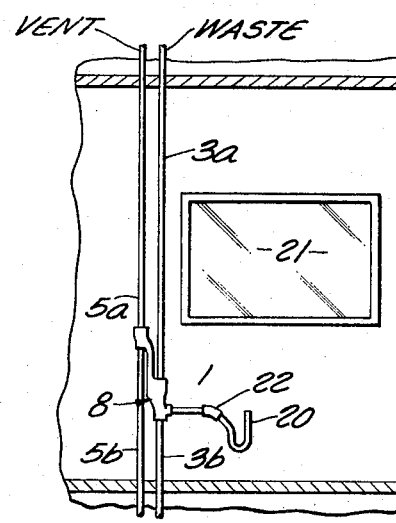
FIGURE 5 is a schematic view illustrating the method of installing the plumbing fitting of the invention in a structure.

FIGURE 5 illustrates the method of assembly of the plumbing fitting in a typical building. The fitting 8 is connected to trap 20 by means of line 1. The fitting 8 is then connected directly to both the waste stack and vent stack as indicated in FIGURE 5, or in the alternative it may be connected to the vent stack indirectly. The point at which the fitting is connected to the vent stack should always be above the highest possible water level in the sink or other fixture to which the trap is attached. Then, even if the waste stack becomes blocked, the communication to the vent stack will always be above the water level in the sink preventing flow of waste into the vent stack.

Figure 6:
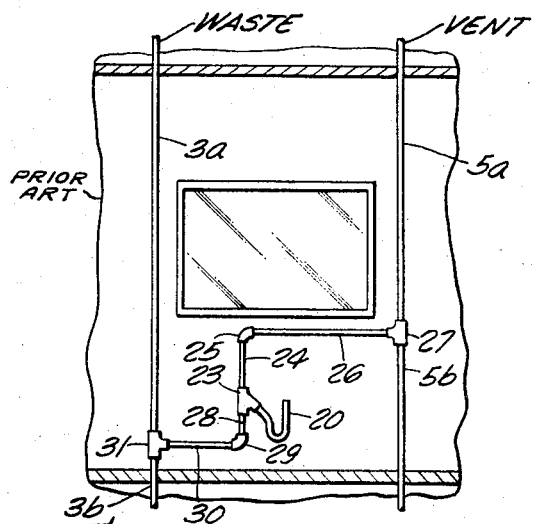
FIGURE 6 is a schematic view illustrating a prior art method of connecting a waste trap with a vent stack and a waste stack.

The economy obtained by the present invention is obvious by reference to FIGURES 5 and 6. FIGURE 5 illustrates the method of connecting the waste trap with the vent stack and waste stack according to the present invention. The waste trap in a typical multiple dwelling building is indicated by 20 and is often positioned below a window 21. Connection of the waste trap to the vent stack and waste stack requires only three fittings, fitting 22, pipe 1, and the fitting 8 of the invention. In using a conventional system, illustrated in FIGURE 6, however, many more components are required. Thus, nine components, pipe and pipe fittings 23–31, are required to make the connection that can be accomplished with just three components using the present invention. The saving in materials and installation time made possible by the present invention is clear.

I claim:

1. A plumbing fitting comprising a chamber means adapted at its upper and lower ends for connection to a vertical waste stack through which waste material flows downwardly, said chamber providing for essentially uninterrupted flow between sections of waste stack, a waste inlet conduit communicating with the chamber, a vent means providing an air passage within the chamber from the point of entry of said waste inlet conduit and through said chamber wall to a point outside and apart from the chamber and waste stack, the vent means entry to the chamber being horizontally removed from said waste entry, said vent means providing an air passage within said chamber even when sewage is passing through the chamber.

2. The combination of claim 1 wherein a liquid diverting means is provided in the chamber to maintain the air passage, when liquid is passing through the chamber.

3. The combination of claim 1 wherein one portion of the vent means is a pipe connecting a vent stack with the chamber and the other portion is formed within the chamber by a lip in the chamber and above said air passage for diverting waste flow away from that wall of the chamber which also serves as a wall for the vent means.

4. The combination of claim 2 wherein the liquid diverting means is a wall separating a portion of said vent from said chamber so that said vent communicates with said chamber only at the waste inlet.

5. The combination of claim 2 wherein the waste inlet, chamber, and vent means are provided with means for sealably connecting with a waste trap, a waste stack, and a vent stack respectively.

6. The combination of claim 5 wherein the connecting means comprise a combination of screw threads and a provision for a sealing compound.

7. The combination of claim 5 wherein a deflecting means is provided on the inner wall of the chamber opposite the waste inlet for deflecting cleaning tools down the waste stack.

8. The combination of claim 5 wherein the vent means has means for connection to only one upwardly extending section of a pipe.

9. The combination of claim 5 wherein the vent means has means for connection to two sections of a vent stack.

10. The combination of claim 5 wherein the chamber has means for connection to two essentially vertically aligned sections of a waste stack.

11. A plumbing fitting comprising a substantially vertical cylindrical chamber for connection to a vertical waste stack, a lateral waste inlet conduit communicating with said chamber, and a vent means providing an air passage between the waste inlet on the interior of said chamber and an exterior vent stack, said vent communicating with the interior of the chamber at a point horizontally removed from said waste inlet and forming an air channel within the chamber, one wall of said channel being formed by the wall of said chamber and the roof of said channel being formed by a lip extending laterally from the inner side of said wall into the interior of said waste conduit so that sewage passing downwardly through the chamber is diverted from said wall to maintain said air passage.

12. A plumbing fitting for connection of a waste source to a waste stack and to a vent stack comprising a pipe forming a cylindrical chamber, both ends of said chamber adapted at their ends for connection with an upper and lower section of an essentially vertically aligned waste stack, said chamber providing a passage for essentially vertical flow of waste from the upper section of the waste stack to the lower section, a waste inlet conduit communicating with said chamber at one of the ends of said waste inlet conduit and adapted at its other end for connection to a waste trap and providing for flow of waste into said chamber and through the lower waste stack section, an air passage formed by an air conduit, adapted at one end for connection to a vent stack, said air conduit communicating at its other end with said chamber at a point horizontally removed from the waste conduit entry to said chamber, said air passage continuing within said chamber from the air conduit entry to the waste conduit entry, said air passage being formed on one side by a wall of the chamber which is contiguous with a wall of the air conduit, and the roof of said air passage being formed within said chamber by a lip extending laterally from said contiguous wall of said chamber into the interior of said chamber from the upper portion of said air conduit entry to the upper portion of said waste conduit so that waste passing downwardly through said chamber is diverted outwardly from said contiguous chamber wall by the lip.

13. A plumbing fitting for connection of a waste trap to a waste stack and vent stack comprising a pipe forming a cylindrical chamber, both ends of said chamber adapted at their ends for connection with an upper and lower section of an essentially vertically aligned waste stack, said chamber providing a passage for essentially vertical flow of waste from the upper section of the waste stack to the lower section, a plurality of waste conduits communicating with said chamber at one of the ends of said waste conduits and adapted at their other end for connection to a waste trap and providing for flow of waste into said chamber and through the lower waste stack section, and an air passage formed by an air conduit adapted at one end for connection to a vent stack, said air conduit at its other end entering said chamber so that a side wall of said air conduit is contiguous with a wall of said chamber and communicating within said chamber with the waste conduit entries thereby providing an enclosed air passage within said chamber from said air conduit to said waste conduits.

References Cited

UNITED STATES PATENTS

| | | | |
|---|---|---|---|
| 796,377 | 8/1905 | Walker | 4—211 |
| 1,165,127 | 12/1915 | Rock | 4—211 |
| 1,747,514 | 2/1930 | Kennedy | 4—211 |
| 2,065,523 | 12/1936 | Groeniger | 4—211 |
| 2,183,040 | 12/1939 | Groeniger | 4—211 |
| 2,482,359 | 9/1949 | Molloy | 4—211 |
| 3,281,866 | 11/1966 | Palowsky | 4—211 |

LAVERNE D. GEIGER, *Primary Examiner.*

H. K. ARTIS, *Assistant Examiner.*